(12) United States Patent
Frayne

(10) Patent No.: US 9,709,183 B2
(45) Date of Patent: Jul. 18, 2017

(54) INFLATION VALVE ALLOWING FOR RAPID INFLATION AND DEFLATION OF AN INFLATABLE OBJECT

(71) Applicant: Windcatcher Technology LLC, Portland, OR (US)

(72) Inventor: Ryan Christopher Frayne, Portland, OR (US)

(73) Assignee: Windcatcher Technology LLC, Portland, OR (US)

( * ) Notice: Subject to any disclaimer, the term of this patent is extended or adjusted under 35 U.S.C. 154(b) by 0 days.

(21) Appl. No.: 15/212,942

(22) Filed: Jul. 18, 2016

(65) Prior Publication Data

US 2016/0327170 A1    Nov. 10, 2016

Related U.S. Application Data

(63) Continuation of application No. 14/621,012, filed on Feb. 12, 2015, now Pat. No. 9,395,007, which is a
(Continued)

(51) Int. Cl.
*F16K 15/20* (2006.01)
*F16K 15/14* (2006.01)
(Continued)

(52) U.S. Cl.
CPC .............. *F16K 15/202* (2013.01); *A47C 4/54* (2013.01); *A47C 27/081* (2013.01);
(Continued)

(58) Field of Classification Search
CPC ...... F16K 15/202; F16K 15/147; F16K 15/20; A47C 4/54; A47C 27/081; A47C 27/088;
(Continued)

(56) References Cited

U.S. PATENT DOCUMENTS 187,411 A    2/1877 Painter
379,827 A    3/1888 Snavely et al.
(Continued)

FOREIGN PATENT DOCUMENTS

CN    1072481 A    5/1993
CN    1355755 A    6/2002
(Continued)

OTHER PUBLICATIONS

State Intellectual Property Office of the P.R.C., First Office Action for Application No. 201480016406.7, Nov. 1, 2016, 18 pages, China.
(Continued)

*Primary Examiner* — Craig Schneider
*Assistant Examiner* — Frederick D Soski
(74) *Attorney, Agent, or Firm* — Alston & Bird LLP

(57) ABSTRACT

Disclosed is an inflation valve enabling a user to quickly inflate and deflate an inflatable object. The inflation valve can include an inflation chamber that is an adequate size to capture a breath of air blown by a user from a distance away from an outside opening of the inflation chamber. This allows surrounding air into the area of low pressure created by the moving air, thereby greatly increasing the amount of air entering the inflatable object. To prevent air from escaping the inflatable object, the inflation valve can include a non-invertible one-way valve and/or an invertible one-way valve. Each valve can prevent air from escaping the inflation chamber until adequate pressure is applied from the outside opening of the inflation chamber, for example, as a result of a user blowing air into the inflation chamber. The invertible one-way valve can be inverted to reverse the properties of the valve.

14 Claims, 15 Drawing Sheets

Related U.S. Application Data continuation of application No. 14/066,458, filed on Oct. 29, 2013, now Pat. No. 8,978,693.

(60) Provisional application No. 61/757,231, filed on Jan. 28, 2013.

(51) Int. Cl.

| | | |
|---|---|---|
| *A47C 27/08* | (2006.01) | |
| *A47C 4/54* | (2006.01) | |
| *A47G 9/10* | (2006.01) | |
| *A63G 31/12* | (2006.01) | |

(52) U.S. Cl.
CPC ......... *A47C 27/088* (2013.01); *A47G 9/1027* (2013.01); *A63G 31/12* (2013.01); *F16K 15/147* (2013.01); *F16K 15/20* (2013.01); *Y10T 137/0318* (2015.04); *Y10T 137/3584* (2015.04); *Y10T 137/7838* (2015.04); *Y10T 137/7847* (2015.04); *Y10T 137/7882* (2015.04); *Y10T 137/88054* (2015.04)

(58) Field of Classification Search
CPC  A47G 9/1027; A63G 31/12; Y10T 137/0318; Y10T 137/3584; Y10T 137/7838; Y10T 137/7847; Y10T 137/7882; Y10T 137/88054
USPC ........................................................ 604/256
See application file for complete search history.

(56) References Cited

U.S. PATENT DOCUMENTS

| | | |
|---|---|---|
| 586,618 A | 7/1897 | Noll |
| 945,234 A | 1/1910 | Hinsdale |
| 1,944,466 A | 1/1934 | Rubin |
| 2,372,218 A | 3/1945 | Manson et al. |
| 2,423,890 A | 7/1947 | Hurt |
| 2,674,064 A | 4/1954 | Gassaway |
| 2,753,573 A | 7/1956 | Barker |
| 2,772,817 A | 12/1956 | Jauch |
| 2,772,829 A | 12/1956 | Crawford et al. |
| 2,799,314 A | 7/1957 | Dreyer et al. |
| 2,812,525 A | 11/1957 | Friedlander |
| 3,112,502 A | 12/1963 | Forsberg |
| 3,133,696 A | 5/1964 | Louis |
| 3,207,420 A | 9/1965 | Navarrete-Kindelan |
| 3,297,241 A | 1/1967 | Andreasson |
| 3,337,117 A | 8/1967 | Lehmacher et al. |
| 3,387,624 A | 6/1968 | Soucy |
| 3,845,795 A | 11/1974 | Andreasson |
| 3,872,525 A | 3/1975 | Lea et al. |
| 4,015,622 A | 4/1977 | Pagani |
| 4,340,977 A | 7/1982 | Brownlee et al. |
| 4,465,188 A | 8/1984 | Soroka et al. |
| 4,557,377 A | 12/1985 | Maloney |
| 4,579,141 A | 4/1986 | Arff |
| 4,674,532 A | 6/1987 | Koyanagi |
| 4,949,530 A | 8/1990 | Pharo |
| 5,098,405 A | 3/1992 | Peterson et al. |
| 5,144,986 A | 9/1992 | Drew |
| 5,230,611 A | 7/1993 | Shelton |
| 5,263,587 A | 11/1993 | Elkin et al. |
| 5,348,157 A | 9/1994 | Pozzo |
| 5,351,711 A | 10/1994 | Peter |
| 5,351,828 A | 10/1994 | Becker et al. |
| 5,427,830 A | 6/1995 | Pharo |
| 5,454,642 A | 10/1995 | De Luca |
| 5,469,966 A | 11/1995 | Boyer |
| 5,500,014 A | 3/1996 | Quijano et al. |
| 5,515,975 A | 5/1996 | Jarvis et al. |
| 5,527,012 A | 6/1996 | Vinkel et al. |
| 5,803,263 A | 9/1998 | Pozzo |
| 5,829,492 A | 11/1998 | Gavronsky et al. |
| 5,830,780 A | 11/1998 | Dennison et al. |
| 6,019,122 A | 2/2000 | Chen |
| 6,089,260 A | 7/2000 | Jaworski et al. |
| 6,108,835 A | 8/2000 | Hwang |
| 6,136,253 A | 10/2000 | Bennett |
| 6,170,513 B1 | 1/2001 | Lo |
| 6,276,532 B1 | 8/2001 | Sperry et al. |
| 6,367,505 B1 | 4/2002 | Raftis et al. |
| 6,494,756 B2 | 12/2002 | Michaud et al. |
| 6,569,283 B1 | 5/2003 | Sperry et al. |
| 6,585,005 B1 | 7/2003 | Raftis et al. |
| 6,776,307 B1 | 8/2004 | Hagihara |
| 6,913,803 B2 | 7/2005 | Peper |
| 6,978,893 B2 | 12/2005 | Peper |
| 7,039,972 B2 | 5/2006 | Chaffee |
| 7,073,545 B2 | 7/2006 | Smith et al. |
| 7,165,677 B2 | 1/2007 | Tanaka et al. |
| 7,168,566 B2 | 1/2007 | Anderson et al. |
| 7,168,567 B2 | 1/2007 | Peper et al. |
| 7,201,273 B2 | 4/2007 | Chen et al. |
| 7,228,969 B2 | 6/2007 | Nakano |
| 7,297,387 B2 | 11/2007 | Koyanagi |
| 7,351,126 B2 | 4/2008 | Turner |
| 7,681,734 B2 | 3/2010 | Liao et al. |
| 7,921,874 B2 | 4/2011 | Tekulve et al. |
| 8,231,421 B1 | 7/2012 | Hubbard et al. |
| 8,272,510 B2 | 9/2012 | Frayne et al. |
| 8,360,102 B2 | 1/2013 | Khouri et al. |
| 8,584,287 B2 | 11/2013 | Hrubant et al. |
| 8,978,693 B2 | 3/2015 | Frayne |
| 9,395,007 B2 | 7/2016 | Frayne |
| 2002/0153468 A1 | 10/2002 | Folkmar |
| 2003/0108699 A1 | 6/2003 | Tanaka |
| 2003/0139271 A1 | 7/2003 | Vangedal-Nielsen et al. |
| 2004/0022459 A1 | 2/2004 | Thomasset et al. |
| 2004/0211697 A1 | 10/2004 | Nakano |
| 2005/0189257 A1 | 9/2005 | Chen et al. |
| 2006/0169329 A1 | 8/2006 | Camis |
| 2006/0191817 A1 | 8/2006 | Nishi et al. |
| 2006/0201960 A1 | 9/2006 | Frayne |
| 2006/0236463 A1 | 10/2006 | Metcalf |
| 2007/0056647 A1 | 3/2007 | Frayne |
| 2007/0084745 A1 | 4/2007 | Yoshifusa |
| 2007/0090013 A1 | 4/2007 | Yoshifusa et al. |
| 2007/0131575 A1 | 6/2007 | Abe |
| 2007/0163916 A1 | 7/2007 | Yoshifusa |
| 2007/0170084 A1 | 7/2007 | Chen et al. |
| 2007/0175517 A1 | 8/2007 | Wu |
| 2007/0295633 A1 | 12/2007 | Liao et al. |
| 2008/0073238 A1 | 3/2008 | Liao et al. |
| 2008/0121307 A1 | 5/2008 | Liao et al. |
| 2008/0160371 A1 | 7/2008 | Spahr et al. |
| 2009/0038725 A1 | 2/2009 | Bibas |
| 2009/0287127 A1 | 11/2009 | Hu et al. |
| 2009/0297068 A1 | 12/2009 | Liao et al. |
| 2010/0096290 A1 | 4/2010 | Frayne et al. |
| 2010/0101970 A1 | 4/2010 | Frayne et al. |
| 2011/0247725 A1 | 10/2011 | Frayne et al. |
| 2011/0297245 A1 | 12/2011 | Chaffee |
| 2012/0312388 A1 | 12/2012 | Jian et al. |
| 2013/0019409 A1 | 1/2013 | Blazar et al. |
| 2014/0209184 A1 | 7/2014 | Frayne |
| 2015/0150383 A1 | 6/2015 | Frayne |

FOREIGN PATENT DOCUMENTS

| | | |
|---|---|---|
| DE | 39 22 802 A1 | 1/1991 |
| DE | 40 07 128 A1 | 4/1991 |
| DE | 296 12 426 U1 | 10/1996 |
| EP | 0255780 A2 | 2/1988 |
| EP | 2070838 A1 | 6/2009 |
| FR | 2711115 A1 | 4/1995 |
| GB | 826784 | 1/1960 |
| GB | 2382017 | 5/2003 |
| JP | 4-154571 A | 5/1992 |
| RU | 2105221 C1 | 2/1998 |
| RU | 2146024 C1 | 2/2000 |

(56) References Cited

FOREIGN PATENT DOCUMENTS

| WO | WO 96/38642 A1 | 12/1996 |
| WO | WO 2011/002190 A2 | 1/2011 |
| WO | WO 2012/174599 A1 | 12/2012 |

OTHER PUBLICATIONS

Bivouac Outdoor, "Using an Exped Pump Sack", *YouTube*, retrieved from <https://www.youtube.com/watch?v=1GuMLopq370>, Feb. 9, 2008.
Free-Flow Packaging International, "MINI PAK'R® Air Cushion Machine, User Manual Revision 4.1," Copyright 2007-2012, USA.
International Preliminary Examining Authority, International Preliminary Report on Patentability for International Application No. PCT/US2014/013398, May 29, 2015, 15 pages, The Federal Institute for Intellectual Property, Russia.
International Searching Authority, International Search Report and Written Opinion for Application No. PCT/US2014/013398, Jun. 10, 2014, 6 pages, United States Patent and Trademark Office, USA.
The Millerair Company, "The Instaflator: Inflatable Air Pump Brochure", http://themillair.com/index.html, Dec. 12, 2006 to Dec. 12, 2015, Internet Archive Wayback Machine at <http://web.archive.org/web/*/http://themillair.com/index.html>.
Therm-A-Rest, "NeoAir Pump Sack™ Instructions: Inflating", retrieved from <http://d1167pfsx3wb1g.cloudfront.net/pdf/NeoAirPumpSackInstructions.pdf> on Dec. 22, 2015.
Therm-A-Rest, "NeoAir Pump Sack™", Jan. 30, 2015 to Sep. 18, 2015, Internet Archive <http://web.archive.org/web/*/http://www.cascadedesigns.com/therm-a-rest/mattresses/accessories/neoair-pump-sack/product>, 4 pages.
Thermarestgear,"Using Your Therm-a-Rest® NeoAir™ Mattress", *YouTube*, <https://www.youtube.com/watch?v=bR8ANkBzBYg>, Apr. 11, 2012.
United States Patent and Trademark Office, Notice of Allowance for U.S. Appl. No. 14/066,458, Nov. 12, 2014, 5 pages, USA.
United States Patent and Trademark Office, Notice of Allowance for U.S. Appl. No. 14/621,012, May 10, 2016, 11 pages, U.S.A.
United States Patent and Trademark Office, Office Action for U.S. Appl. No. 14/066,458, Feb. 5, 2014, 12 pages, USA.
United States Patent and Trademark Office, Office Action for U.S. Appl. No. 14/066,458, Aug. 29, 2014, 12 pages, USA.
United States Patent and Trademark Office, Office Action for U.S. Appl. No. 14/621,012, Sep. 21, 2015, 29 pages, U.S.A.
European Patent Office, Invitation pursuant to Rule 62a(1) EPC and Rule 63(1) EPC for Application No. 14743628.1, Sep. 19, 2016, 4 pages, Netherlands.

INFLATION VALVE ALLOWING FOR RAPID INFLATION AND DEFLATION OF AN INFLATABLE OBJECT

CROSS REFERENCE RELATED TO APPLICATIONS

This application is a continuation of U.S. application Ser. No. 14/621,012, filed Feb. 12, 2015, which is a continuation of U.S. application Ser. No. 14/066,458, filed Oct. 29, 2013 and now issued as U.S. Pat. No. 8,978,693, which claims priority to U.S. provisional application No. 61/757,231, filed on Jan. 28, 2013, each of which is expressly incorporated by reference herein in their entirety.

BACKGROUND

1. Technical Field

The present disclosure relates to inflation valves and more specifically to an inflation valve that allows for rapid inflation and deflation of an inflatable object.

2. Introduction

Numerous types of objects are currently available as inflatable objects that can be inflated prior to use and deflated when not needed. For example, chairs, mattresses, pool toys, pools, etc., are all available as inflatable objects. Inflatable objects are advantageous because, when deflated, they can be easily stored and transported. For example, a large inflatable object, such as a mattress, can be stored in a much smaller space when it is deflated. This makes inflatable objects ideal for travel, such as camping, because they can be easily transported and stored when deflated.

While inflatable objects provide many advantages, traditional inflation valves used to inflate inflatable objects provide numerous challenges. To prevent air from escaping the inflatable object between breaths, many inflation valves are made small to limit the amount of air that can exit the inflatable object. The small size of these inflation valves also allows a user to place the valve in their mouth while inflating, further limiting the amount of air that can escape between breaths. While effective at preventing air from escaping, these valves also limit the amount of air that can be blown into the inflatable object and can be unsanitary.

Some inflation valves include an internal valve that closes the inflation valve to prevent air from escaping an inflatable object. These types of internal valves are often perpendicular to the opening of the inflation valve and require substantial force to open. For example, these valves can require a user to pinch the inflation valve to open the internal valve and allow the user to inflate the inflatable object. These types of internal valves generally require a user to place their mouth on the inflation valve because the small size of the inflation valve makes it difficult to blow air into the inflation valve from a distance away from the inflation valve and air can easily escape the inflatable object when the internal valve is opened.

Alternatively, some internal valves require a pump to open the internal valve to allow inflation of the inflatable object. While some of these types of inflation valves provide for a larger conduit by which air can enter the inflatable object and do not require a user to place the inflation valve in the user's mouth, these types of valve do require the use of a pump, which reduces the portability of the inflatable object. Accordingly, there is a need for an improved inflation valve.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed is an inflation valve that enables a user to quickly inflate and deflate an inflatable object. To accomplish this, the inflation valve can include at least one one-way valve attached within an inflation chamber that is attached to an inflatable object. The one way valve can be designed to open when adequate pressure is applied to the one-way valve from one direction, while remaining closed when adequate pressure is applied to the one-way valve from the opposite direction. Adequate pressure to open the one-way valve can be created by a user blowing into the one-way valve and adequate pressure to close the one way valve can be created by the air trapped inside the inflatable object. Thus the one-way valve can allow air blown by the user to enter the inflatable object while preventing the air trapped in the inflatable object from escaping the inflatable object.

The one-way valve also allows for larger inflation chambers because the user is not required to place their mouth over the inflation chamber to force air into the inflatable object or prevent air from escaping the inflatable object. This can increase the amount of air that can enter and/or exit the inflatable object. Further, low pressure created by the fast moving air being blown into the inflation chamber can cause surrounding air to be drawn into the inflation chamber from the area between the user and the inflation chamber, thereby greatly increasing the speed at which the inflatable object can be inflated.

The inflation chamber can be open at opposing ends to provide a large conduit by which air can enter and/or exit the inflatable object. In some embodiments, the inflation chamber can be an adequate size to capture a breath of air blown by a user from a distance away from an outside opening of the inflation chamber. The fast blowing air being blown into the inflation chamber by the user can create an area of low pressure around the air stream. The low pressure can draw in surrounding air into the area of low pressure from the space between the user and the inflation chamber, thereby greatly increasing the amount of air entering the inflatable object.

To prevent air from escaping the inflatable object, the inflation valve can include a non-invertible one-way valve and/or an invertible one-way valve. The non-invertible one-way valve can be positioned in the inflation chamber such that the non-invertible one-way valve opens when adequate pressure is applied to the non-invertible one-way valve from the outside opening of the inflation chamber, for example, as a result of a user blowing air into the inflation chamber. An invertible one-way valve can be inverted, allowing a user to invert the properties of the invertible one-way valve. Thus, an invertible one-way valve positioned to open when adequate air pressure is applied to the invertible one-way valve from the outside of the inflation chamber, can be inverted to open when adequate air pressure is applied to the invertible one-way valve from inside the inflatable object.

In some embodiments, the inflation valve can include a non-invertible one-way valve and an invertible one-way valve. In this type of embodiment, the invertible one-way valve can be designed such that, when inverted to allow air to escape the inflatable object, the invertible one-way valve rests between the ends of the non-invertible one-way valve, causing the non-invertible one-way valve to open when the invertible one-way valve opens. This can allow the inflatable object to be rapidly deflated.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
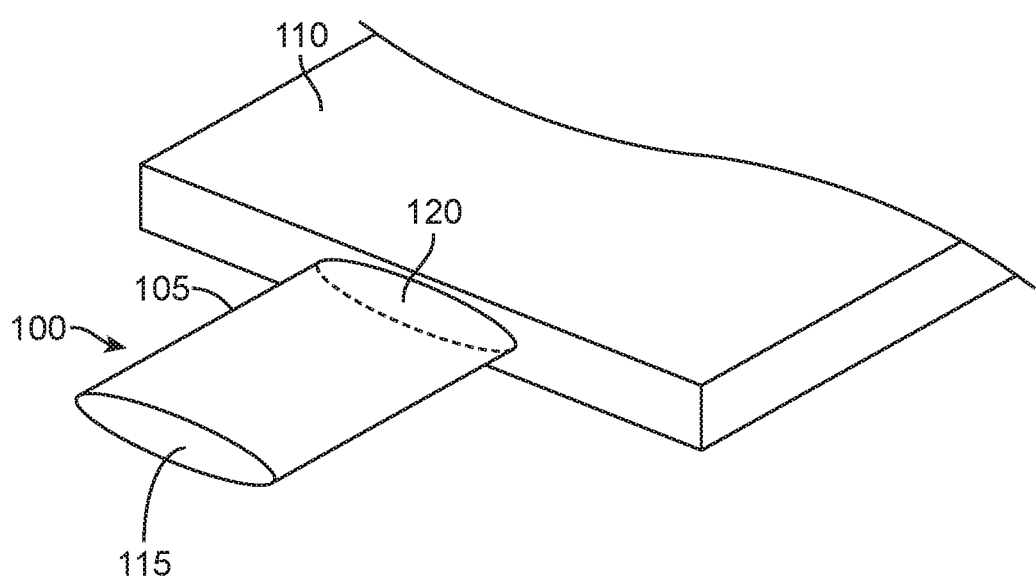
FIG. 1 illustrates an exemplary embodiment of an inflation valve including an inflation chamber.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for an inflation valve that allows for an inflatable object to be rapidly inflated and/or deflated. Traditional inflation valves include internal valves that cannot be opened by blowing into the inflation valve from a distance. The user must physically open the internal valve by, for example, pinching the internal valve. Further, these internal valves allow air to escape when open, thus requiring a user to place the inflation valve in their mouth while inflating to force air into the inflatable object or and prevent air from escaping the inflatable object. As a result, inflating and/or deflating an inflatable object with a traditional inflation valve can be time consuming and unsanitary and/or require the use of additional devices such as pumps.

Disclosed is an inflation valve that enables a user to quickly inflate and deflate an inflatable object. To accomplish this, the inflation valve can include at least one one-way valve attached within an inflation chamber that provides a conduit to inflate an inflatable object. The one way valve can be designed to open when adequate pressure is applied to the one-way valve from one direction, while remaining closed when adequate pressure is applied to the one-way valve from the opposite direction. Adequate pressure to open the one-way valve can be created by a user blowing into the one-way valve and/or using a pump to blow air into the one-way valve. Adequate pressure to close the one way valve can be created by the air trapped inside the inflatable object. Thus the one-way valve can allow air blown by the user to enter the inflatable object while preventing the air trapped in the inflatable object from escaping the inflatable object.

The one-way valve also allows for larger inflation chambers because the user is not required to place their mouth over the inflation chamber to prevent air from escaping the inflatable object. This can increase the amount of air that can enter and/or exit the inflatable object. Further, low pressure created by the fast moving air being blown into the inflation chamber can cause surrounding air to be drawn into the inflation chamber from the area between the user and the inflation chamber, thereby greatly increasing the speed at which the inflatable object can be inflated.

The inflation chamber can be open at opposing ends to provide a large conduit by which air can enter and/or exit the inflatable object. In some embodiments, the inflation chamber can be an adequate size to capture a breath of air blown by a user from a distance away from an outside opening of the inflation chamber. The fast blowing air being blown into the inflation chamber by the user can create an area of low pressure around the air stream. The low pressure can draw surrounding air into the area of low pressure from the space between the user and the inflation chamber, thereby greatly increasing the amount of air entering the inflatable object.

To prevent air from escaping the inflatable object, the inflation valve can include a non-invertible one-way valve and/or an invertible one-way valve. The non-invertible one-way valve can be positioned in the inflation chamber such that the non-invertible one-way valve opens when adequate pressure is applied to the non-invertible one-way valve from the outside opening of the inflation chamber, for example, as a result of a user blowing air into the inflation chamber. An invertible one-way valve can be inverted, allowing a user to invert the properties of the invertible one-way valve to. Thus, an invertible one-way valve positioned to open when adequate air pressure is applied to the invertible one-way valve from the outside of the inflation chamber can be inverted to open when adequate air pressure is applied to the invertible one-way valve from inside the inflatable object.

In some embodiments, the inflation valve can include a non-invertible one-way valve and an invertible one-way valve. In this type of embodiment, the invertible one-way valve can be positioned such that, when inverted to allow air to escape the inflatable object, the invertible one-way valve rests between the ends of the non-invertible one-way valve, causing the non-invertible one-way valve to open when the invertible one-way valve opens. This can allow the inflatable object to be rapidly deflated.

FIG. 1 illustrates an exemplary embodiment of inflation valve 100 designed to inflate inflatable object 110. As illustrated, inflation chamber 105 can be attached to inflatable object 110 such that inflation chamber 105 protrudes from inflatable object 110. Inflation chamber 105 can include outside opening 115 and inside opening 120 which provide a conduit by which air can enter and\or exit inflation chamber 105. A user can inflate inflatable object 110 by blowing air into outside opening 115 which travels through inflation chamber 105 and into inflatable object 110 through inside opening 120.

In some embodiments, inflation chamber 105 can be of an adequate size to receive a full breath of air blown by a user while the user is a distance away from inflation chamber 105. This can maximize the amount of air blown by the user that is captured by inflation chamber 105 and also allow for surrounding air to enter inflation chamber 105, thus increasing the speed by which inflatable object 110 is inflated.

Figure 2:
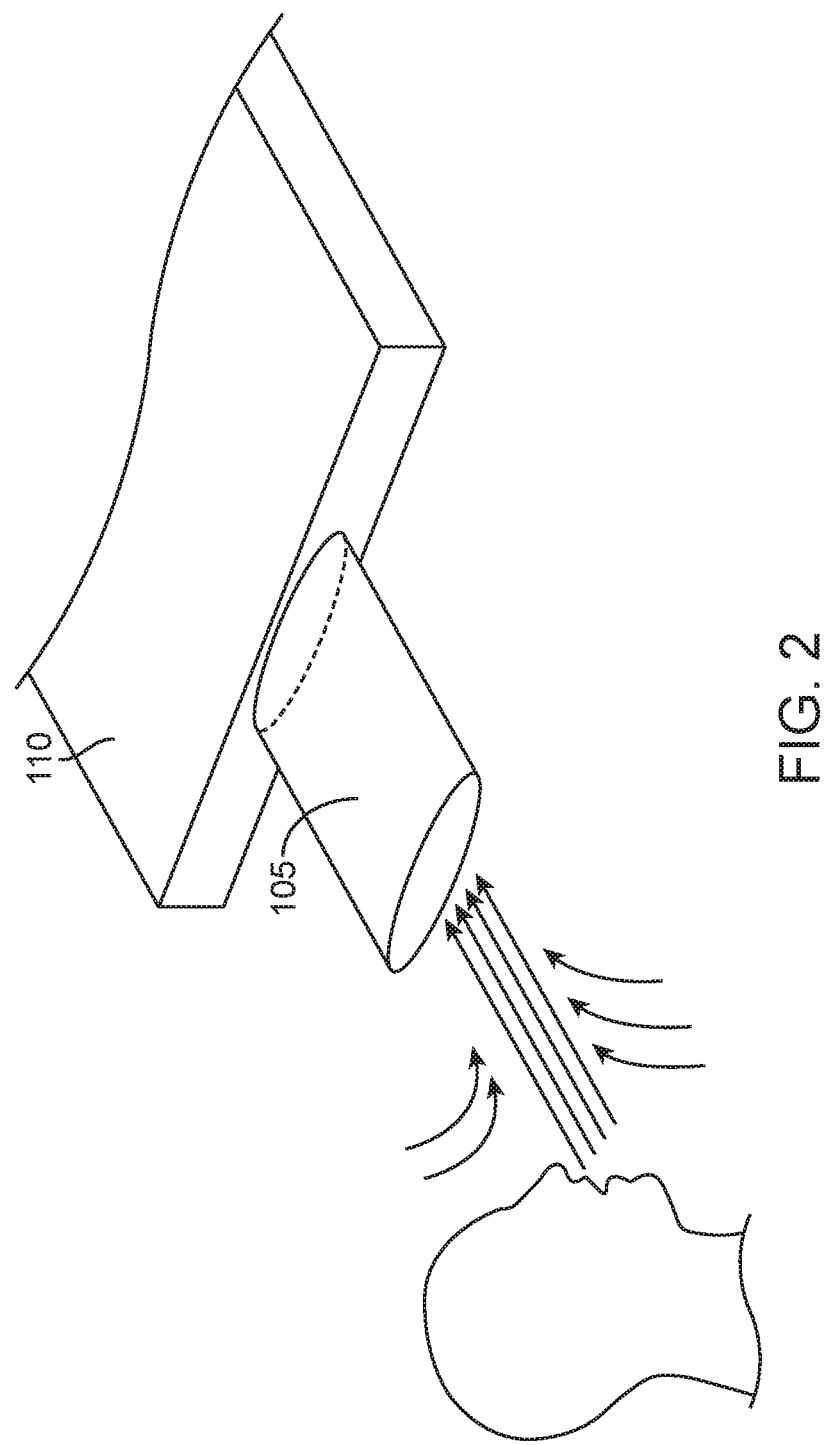
FIG. 2 illustrates surrounding air being drawn into an inflatable object.

FIG. 2. illustrates surrounding air being drawn into inflatable object 110 when a user blows into inflation chamber 105 from a distance away from inflation chamber 105. As shown, a user can be positioned an adequate distance away from inflation chamber 105 to allow surrounding air to travel between inflation chamber 105 and the user. When the user blows air into inflation chamber 105, the fast moving air creates an area of low pressure around the air stream entering inflation chamber 105. As a result of this low pressure, surrounding air can be drawn into the area of low pressure from the space between the user and inflation chamber 105. The air blown by the user and the air drawn in from the low pressure can then enter inflatable object 110, thereby greatly increasing the speed at which inflatable object 110 is inflated.

In some embodiments, inflation chamber 105 can include a one-way valve that prevents air from escaping inflatable object 110. The one-way valve can be attached inside inflation chamber 105 such that air must travel through the one-way valve to enter and/or exit inflatable object 110.

A one-way valve can be designed to open when adequate air pressure is applied to the one-way valve from outside opening 115. For example, adequate air pressure can be applied as a result of a user or pump blowing air into inflation chamber 105 from outside opening 115, causing the one-way valve to open to allow air to enter inflatable object 110.

Further, the one-way valve can be designed to close when adequate pressure is applied to the one-way valve from the opposite end, for example from the air trapped inside inflatable object 110. Thus, the one-way valve can open to allow air to enter inflatable object 110 when a user blows into inflation chamber 105 from outside opening 115, and close from the air pressure inside inflatable object 110 when the user stops blowing. By automatically trapping the air between each of the user's breaths, the user can repeatedly blow into inflation chamber 105, adding additional air into inflatable object 110 until inflatable object 110 is adequately full.

To accomplish this, the one-way valve can include an outer open end and an inner open end, through which air can travel when the one-way valve is open. The one-way valve can be attached to the inside of inflation chamber 105 such that the outer open end of the one-way valve is positioned closer to outside opening 115 than the inner open end of the one-way valve is positioned to outside opening 115. The one-way valve can be attached to the inside of inflation chamber 105 along the entirety of the outer open end of the one-way valve to create a seal that forces all air to travel through the one-way valve to enter and/or exit inflatable object 110. Air inside inflatable object 110 can occupy the space between inflation chamber 105 and the inner end of the one-way valve, causing adequate air pressure to close the one-way valve when adequate pressure to open the one-way valve is not being applied from the opposite direction. To accomplish this, the one way valve should be long enough that the inner end can adequately close the one way valve.

In some embodiments, the one-way valve can be a non-invertible one-way valve that remains in a fixed position within inflation chamber 105. Alternatively, in some embodiments, the one-way valve can be an invertible one-way valve that can be inverted to reverse the direction of the invertible one-way valve. Thus, when inverted, an invertible one-way valve can close when adequate pressure is applied from outside opening 115 of inflation chamber 105, and open when adequate air pressure is applied from inside of inflatable object 110.

Figure 3A:
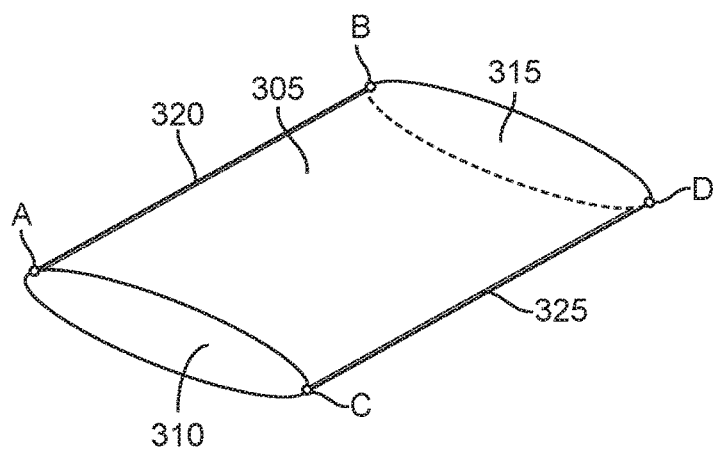
FIGS. 3A-3D illustrate an exemplary embodiment of a non-invertible one-way valve.

FIGS. 3A-3D illustrate an exemplary embodiment of a non-invertible one-way valve. FIG. 3A shows non-invertible one-way valve 305 alone, without inflation chamber 105. As illustrated, non-invertible one-way valve 305 includes outer open end 310 and inner open end 315. Non-invertible one-way valve 305 further includes left edge 320 spanning from point A to point B, and right edge 325 spanning from point C to point D.

Figure 3B:
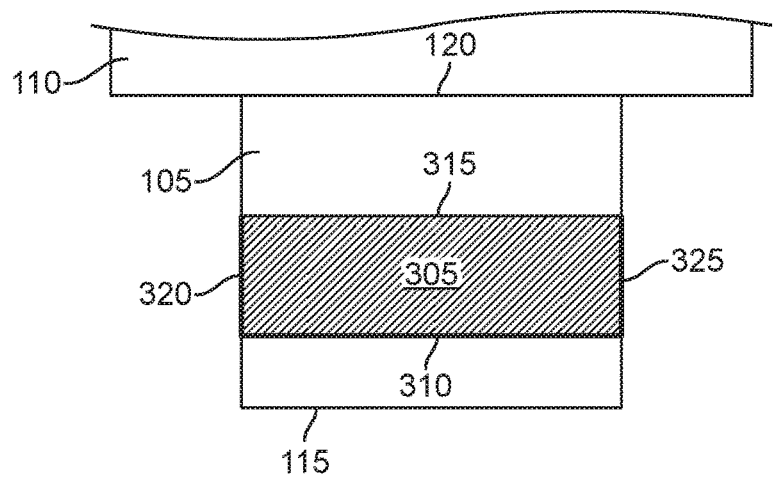

FIG. 3B illustrates non-invertible one-way valve 305 attached to the inside of inflation chamber 105. As shown, non-invertible one-way valve 305 is attached to the inside of inflation chamber 105 so that outer open end 310 of non-invertible one-way valve 305 is positioned closer to outside opening 115 and inner open end 315 of non-invertible one-way valve 305 is positioned closer to inside opening 120.

Non-invertible one-way valve 305 can be attached to the inside of inflation chamber 105 along left edge 320 and right edge 325, which can prevent non-invertible one-way valve 305 from being inverted.

Non-invertible one-way valve 305 can further be attached to the inside of inflation chamber 105 along the edge, or near the edge, of outer open end 310. This can create a seal between non-invertible one-way valve 305 and inflation chamber 105 that forces all air to travel through non-invertible one-way valve 305 to enter and/or exit inflatable object 110.

While adequate pressure to open non-invertible one-way valve 305 is not being applied, non-invertible one-way valve 305 can be closed from adequate pressure applied from air inside inflatable object 110, thus preventing air from entering or escaping inflatable object 110. Adequate pressure to open non-invertible one-way valve 305 can be applied using manual force, such as a user using their hand to open non-invertible one-way valve 305, or alternatively, by applying adequate air pressure, such as when a user or pump blows air into outside opening 115 of inflation chamber 105.

Figure 3C:
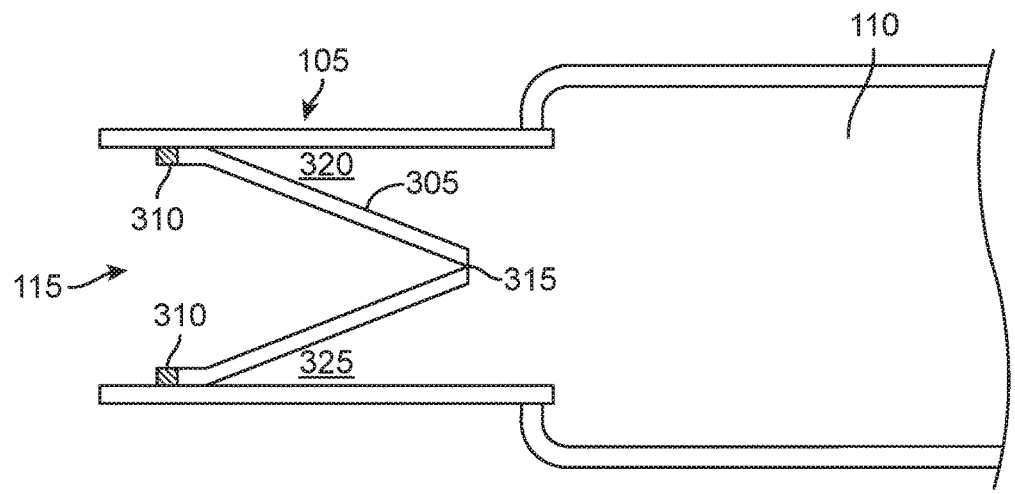

FIG. 3C illustrates a side sectional view of non-invertible one-way valve 305 attached to inflation chamber 105. As shown, non-invertible one-way valve 305 is attached to inflation chamber 105 along outer open end 310 to create a seal that prevents air from traveling in and/or out of inflatable object 110 while non-invertible one-way valve 305 is closed.

As shown, inner open end 315 of non-invertible one-way valve 305 is closed, thus preventing air from traveling in and/or out of inflatable object 110. Air blown into inflatable object 110 can fill spaces 320 and 325 between inner open end 315 and inflation chamber 305, and apply pressure to inner open end 315 that closes non-invertible one-way valve 315 while adequate pressure to open non-invertible one-way valve 305 is not being applied. Adequate pressure can be applied by a user reaching into inflation chamber 105 and manually opening inner open end 315.

Alternatively adequate pressure can be applied by a user blowing into outside opening 115 of inflation chamber 105. While adequate air pressure is applied to non-invertible one-way valve 305 from outside opening 115, i.e. while a user is blowing into outside opening 115, inner open end 315 can open, allowing air to enter inflatable object 110. When the air pressure is removed from non-invertible one-way valve 305, i.e., when the user stops blowing into outside opening 115, the air inside inflatable object 110 can apply pressure to non-invertible one way valve 305, causing at least inner open end 315 to close, thus preventing air from entering and/or exiting inflatable object 110.

Figure 3D:
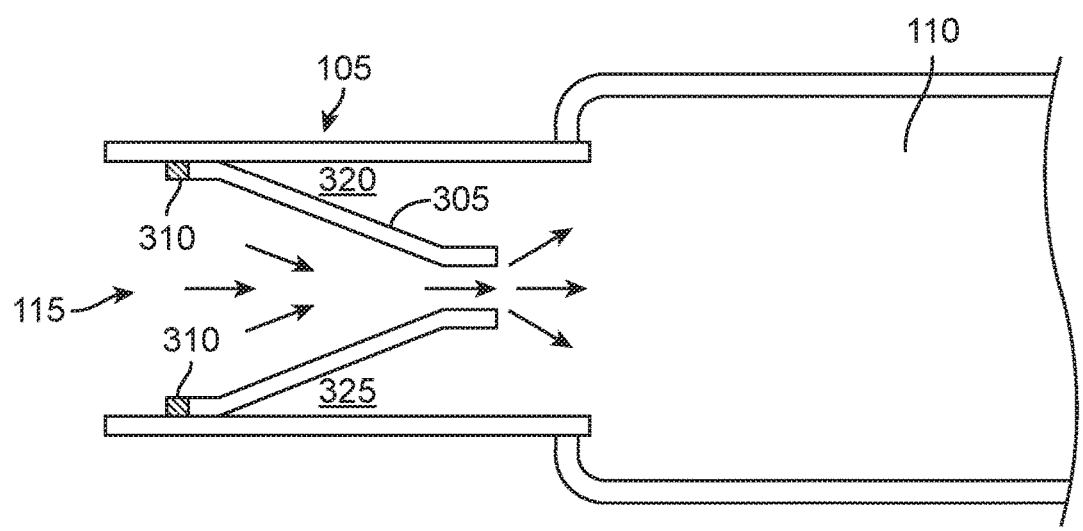

FIG. 3D illustrates a second side sectional view of non-invertible one-way valve 305 attached to inflation chamber 105. As shown, air pressure applied to non-invertible one-way valve 305 from outside opening 115 has opened inner open end 315, allowing air to enter inflatable object 110. Open end 315 can close when the air pressure is no longer applied to non-invertible one-way valve 305, i.e. when a user is no longer blowing into open end 115. Thus air blown into inflatable object 110 will not escape when the user has adequately filled inflatable object 305 or pauses in between breaths.

In some embodiments, inflation valve 100 can include an invertible one-way valve in addition to or instead of non-invertible one-way valve 305, which can prevent air from entering and/or exiting inflatable object 110. An invertible one-way valve can be similar to non-invertible one-way valve 305 except it can be inverted, whereas non-invertible one-way valve 305 cannot be inverted.

Inverting the invertible one-way valve can cause the properties of the invertible one-way valve to reverse such that the invertible one-way valve will open when adequate air pressure is applied to the inverted invertible one-way valve from inside inflatable object 110, rather than when adequate air pressure is applied to the invertible one-way valve from outside of inflatable chamber 105. This can allow a user to change the properties of the invertible one-way valve to accommodate either inflating or deflating inflatable object 110.

Figure 4A:
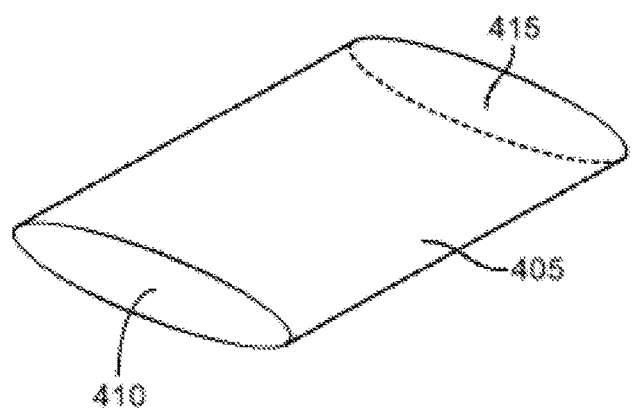
FIGS. 4A-4D illustrate an exemplary embodiment of an invertible one-way valve.

FIGS. 4A-4D illustrate an exemplary embodiment of an invertible one-way valve. FIG. 4A shows invertible one-way valve 405 alone, without inflation chamber 105. As shown, invertible one-way valve 405 includes outer open end 410 and inner open end 415.

Figure 4B:
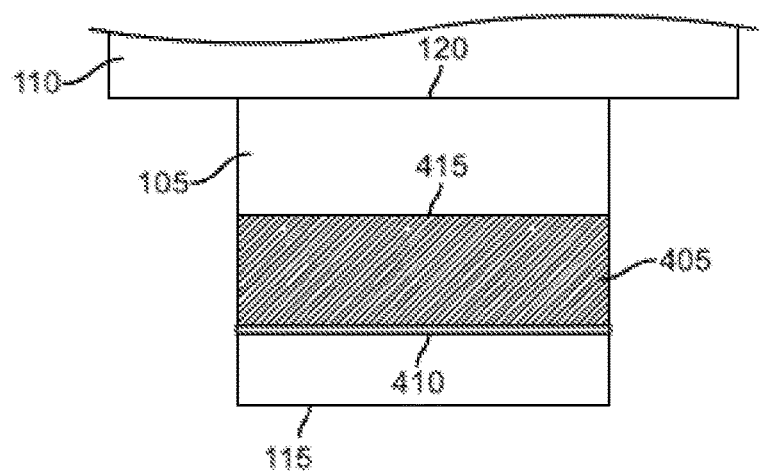

FIG. 4B illustrates invertible one-way valve 405 attached to the inside of inflation chamber 105. As shown, invertible one-way valve 405 is attached to the inside of inflation chamber 105 along the edge, or near the edge, of outer open end 410. This can create a seal between invertible one-way valve 405 and inflation chamber 105 that forces all air to travel through invertible one-way valve 405 to enter and/or exit inflatable object 110.

Unlike non-invertible one-way valve 305, invertible one-way valve 405 is not attached to the inside of inflation chamber 105 along the edges of invertible one-way valve 405, thus allowing invertible one-way valve 405 to be inverted by a user. As shown, invertible one-way valve 405 is positioned similar to non-invertible one-way valve 305 such that outer open end 410 is closer to outside opening 115 than inner open end 415 is to outside opening 115.

In this configuration, invertible one-way valve 405 acts similarly to non-invertible one-way valve 305 in that it prevents air from escaping inflatable object 110 when invertible one-way valve 405 is closed, and invertible one-way valve 405 opens to allow air into inflatable object 110 when adequate air pressure is applied to invertible one-way valve 405 from outside opening 115.

To invert invertible one-way valve 405, a user can reach into invertible one-way valve 405 and pull inner open end 415 towards outside opening 115. Inverting invertible one-way valve 405 in this way reverses the properties of invertible one-way valve 405. For example, when inverted, invertible one-way valve 405 will open when adequate air pressure is applied to invertible one-way valve 405 from inside opening 120 for example, from the pressure applied from air trapped inside inflatable object 110.

A user can leave invertible one-way valve 405 in its original un-inverted position to inflate inflatable object 110. This can allow air blown by the user into outside opening 115 to enter inflatable object 110 without being able to escape. When the user wishes to deflate inflatable object 110, the user can invert invertible one-way valve 405. Inverting invertible one-way valve 405 allows the pressure created by the air trapped inside inflatable object 110 to open invertible one-way valve 405, thus deflating inflatable object 110.

Figure 4C:
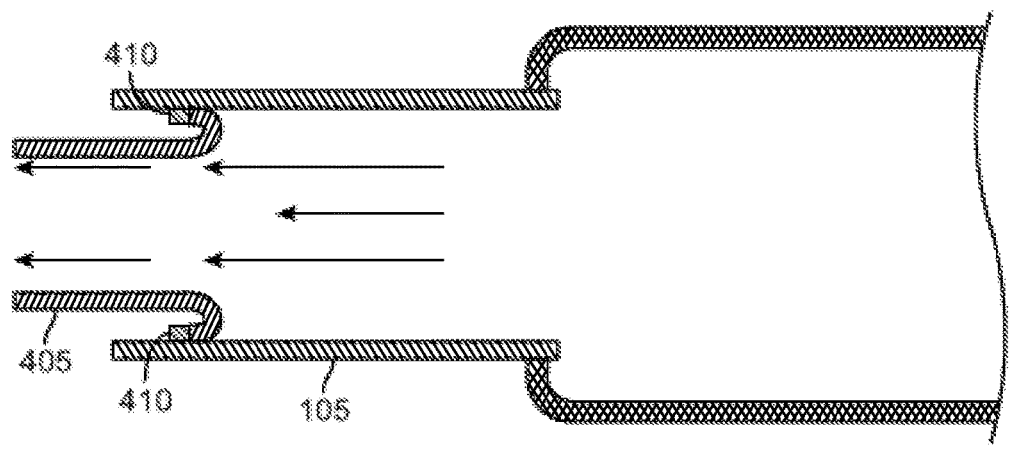

FIG. 4C illustrates a side sectional view of invertible one-way valve 405 in an inverted position. As shown, invertible one-way valve 405 is attached to inflation chamber 105 at outer open end 410. Further, inner open end 415 had been pulled through outer open end 410 to invert invertible one-way valve 405. Air pressure inside inflatable object 110 can then cause invertible one-way valve 405 to open and deflate invertible one-way valve 405.

Figure 4D:
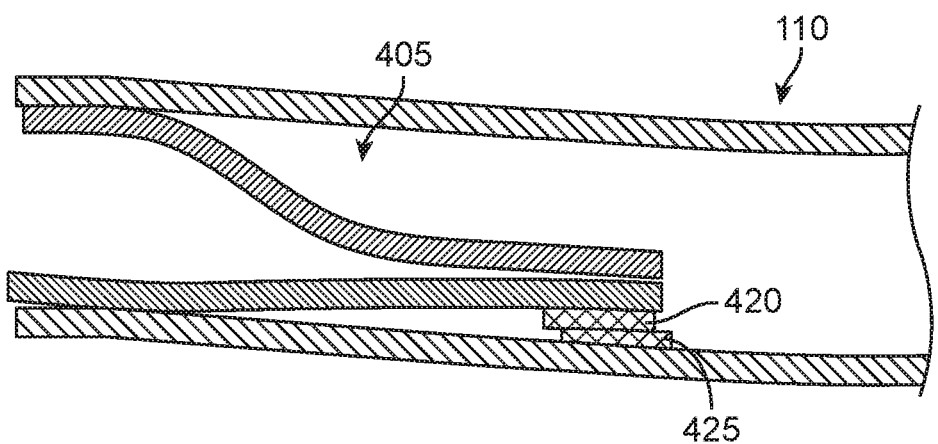

FIG. 4D illustrates an embodiment of invertible one-way valve 405 including an attachment element to maintain the position of invertible one-way valve 405. When air pressure inside inflatable object 110 increases to a sufficient point, it can cause invertible flat valve 405 to invert. To prevent this from happening, in some embodiments, invertible one-way valve 405 can include attachment element 420 that can be used to hold invertible one-way valve 405 in the desired position. As shown, attachment element 420 can be attached to attachment element 425 to hold invertible one-way valve 405 in the desired position. Attachment element 425 can be any type of attachment element known in the art such as a hook and loop fastener, button, hook, magnet, etc. To invert invertible one-way valve 405 in this type of embodiment, a user can first detach attachment element 420 from attachment element 425 and then manually invert invertible one-way valve 405.

In some embodiments, an inflation valve can include both a non-invertible one-way valve and an invertible one-way valve. This type of embodiment is illustrated in FIGS. 5A-5D.

Figure 5A:
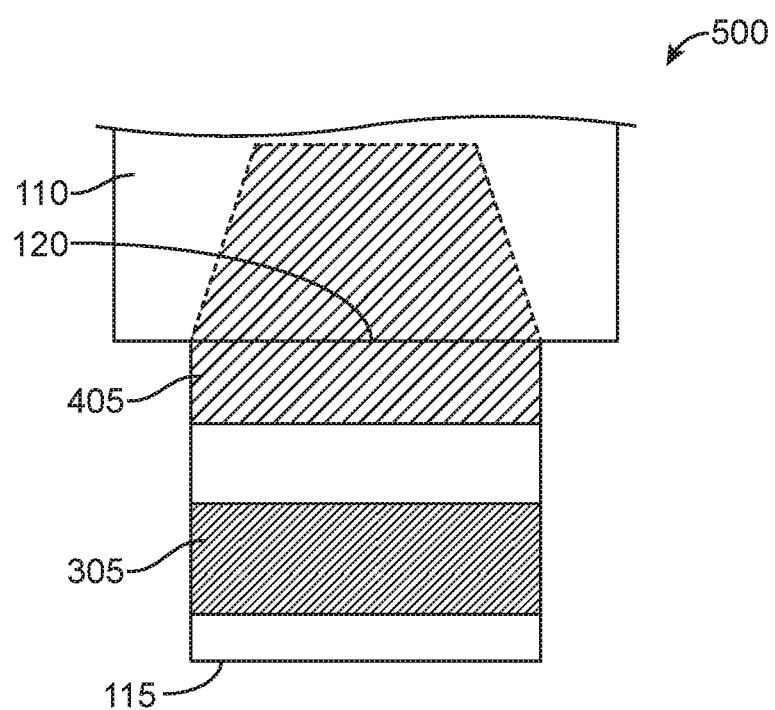
FIGS. 5A-5D illustrate an inflation valve including a non-invertible one-way valve and an invertible one-way valve.

FIG. 5A shows inflation valve 500 including both non-invertible one-way valve 305 and invertible one-way valve 405. As shown, non-invertible one-way valve 305 is positioned closer to outside opening 115 and invertible one-way valve 405 is positioned closer to inside opening 120. Further, a portion of invertible one-way valve 405 is extended into inflatable object 110.

Both non-invertible one-way valve 305 and invertible one-way valve 405 are positioned to open when adequate air pressure is applied from outside opening 115, and to remain closed when adequate pressure is not being applied from outside opening 115. Thus, a user can inflate inflatable object 110 by blowing into inflation valve 500 at outside opening 115.

Figure 5B:
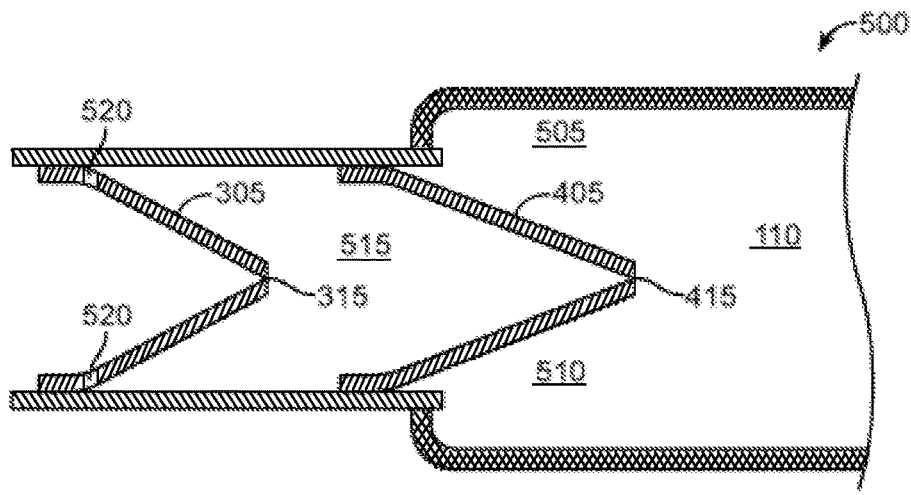

FIG. 5B illustrates a sectional cross view of inflation valve 500. As illustrated, both non-invertible one-way valve 305 and invertible one-way valve 405 are closed, preventing air from entering and/or escaping inflatable object 110. Air inside inflatable object 110 at spaces 505 and 510 can provide pressure to inner open end 415 and cause invertible one-way valve 405 to remain closed. Likewise, air trapped in air pocket 515 between non-invertible one-way valve 305 and invertible one-way valve 405 can provide pressure to inner open end 315 and cause non-invertible one-way valve 305 to remain closed.

In some embodiments, invertible one-way valve 515 can include vent holes 520 that can be used to release air trapped in air pocket 515. For example, if a user has inflated inflatable object 110 to a desired pressure, air trapped in air pocket 515 can be released through vent holes 510 rather than being forced into inflatable object 110. Alternatively, a user can release the air trapped in air pocket 515 by manually opening non-invertible one-way valve 305, for example, by using their hand to open inner open end 315.

Figure 5C:
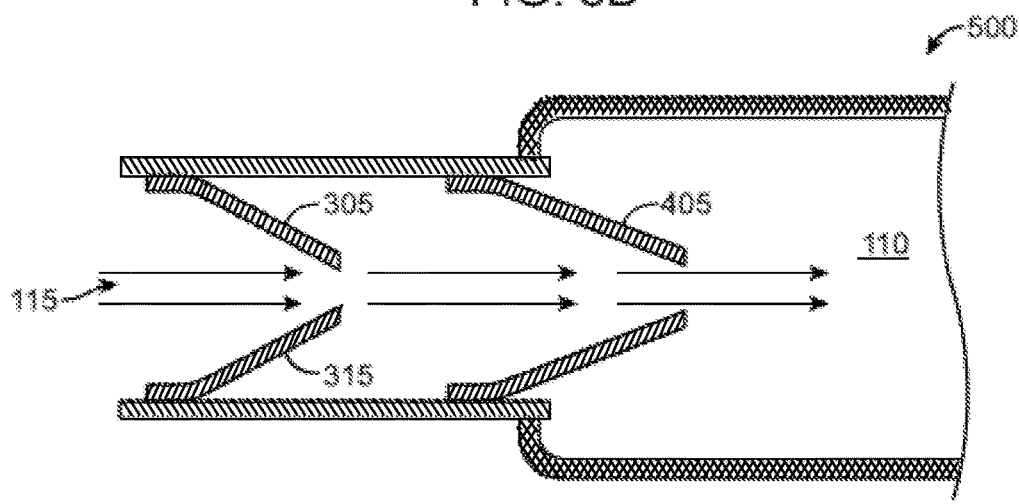

As illustrated in FIG. 5C, adequate air pressure applied from outside opening 115 can cause both non-invertible one-way valve 305 and invertible one-way valve 405 to open and allow air into inflatable object 110.

Figure 5D:
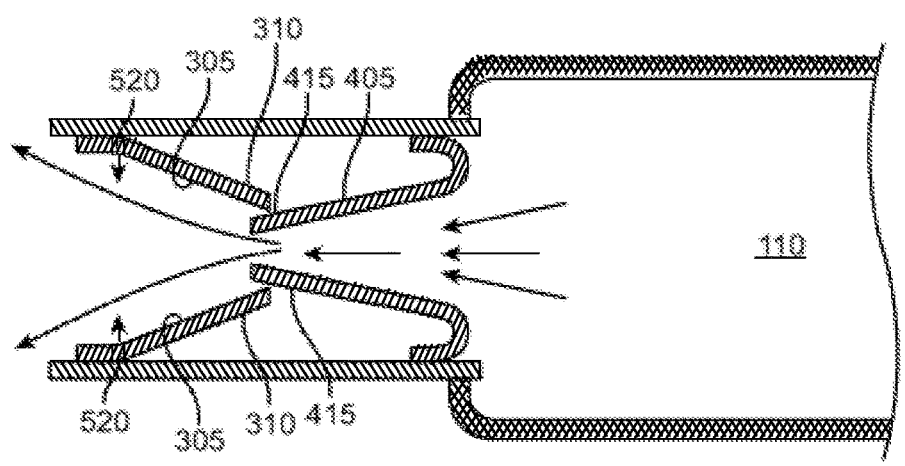

FIG. 5D illustrates invertible one-way valve 405 inverted to deflate inflatable object 110. As shown, inner open end 415 of invertible one-way valve 405 has been inverted through outer open end 410 of invertible one-way valve 405. Further, inner open end 415 is positioned between inner open end 310 of non-invertible one-way valve 305. This can cause non-invertible one-way valve 305 to open when invertible one-way valve 405 is opened. For example, adequate air pressure applied to invertible one-way valve 405 from inside inflatable object 110 can cause invertible one-way valve 405 to open, which in turn causes non-invertible one-way valve 305 to open, thus allowing air in inflatable object 110 to escape. Air trapped in air pockets created between invertible one-way valve 405 and non-invertible one-way valve 305 can be released through vent holes 520.

Figure 6A:
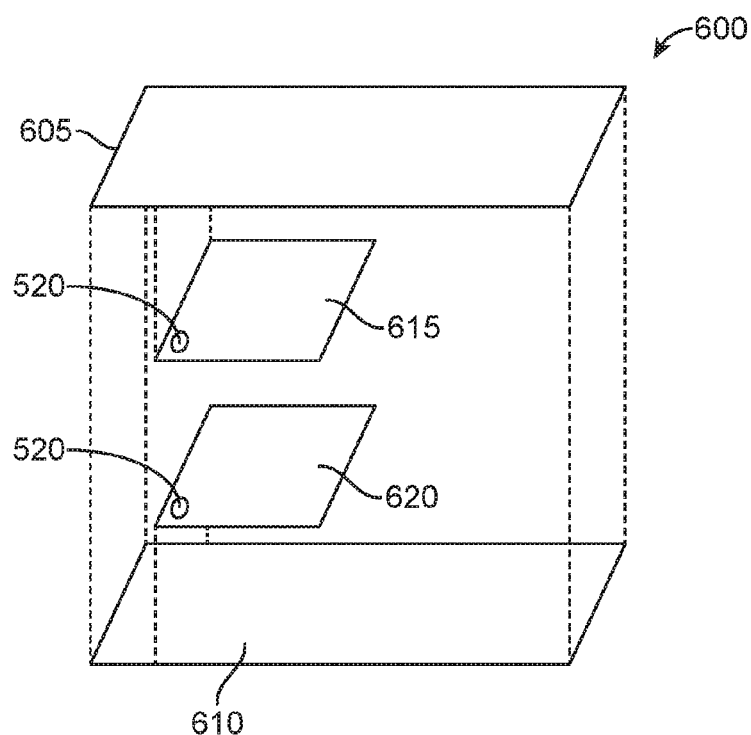
FIGS. 6A-6D illustrate an inflation valve where the inflation chamber and the invertible one-way valve are one continuous object.

While FIGS. 5A-5D illustrate inflation chamber 105 and invertible one-way valve 405 as separate objects attached to each other, this is just one possible embodiment and is not meant to be limiting. In some embodiments, inflation chamber 105 and invertible one-way valve 405 can be one continuous object. FIGS. 6A-6D illustrate an inflation valve where the inflation chamber and the invertible one-way valve are one continuous object. FIG. 6A shows inflation valve 600 unassembled. As shown inflation valve 600 can include outer plies 605 and 610 and inner plies 615 and 620. When attached to each other, outer plies 605 and 610 can form inflation chamber 105 and invertible one-way valve 405. Inner plies 615 and 620 can form non-invertible one-way valve 405 when attached to each other and to outer plies 605 and 610. Inner plies 605 and 610 can include vent holes 520.

Figure 6B:
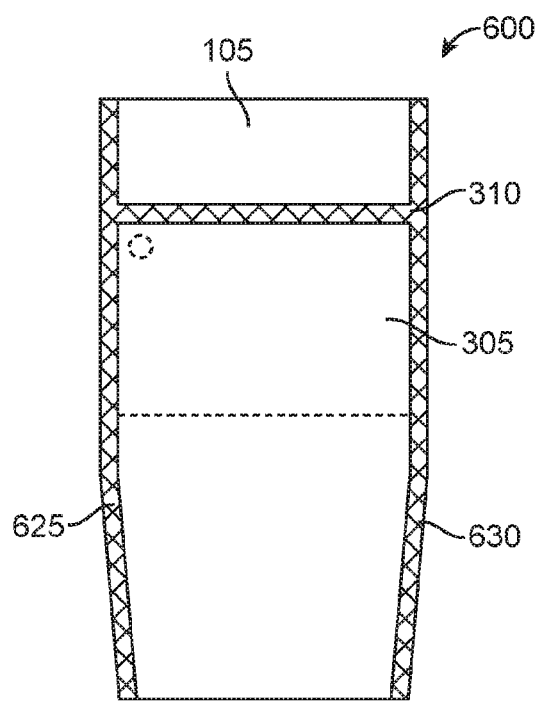

FIG. 6B illustrates inflation valve 600 assembled. As shown outer plies 605 and 610, and inner plies 615 and 620 can be attached to each other along left edge 625 and right edge 630. Further, non-invertible one-way valve 305 can be attached to inflation chamber 105 along the edge of outer open end 310, thus creating a seal between inflation chamber 105 and non-invertible one-way valve 305.

Figure 6C:
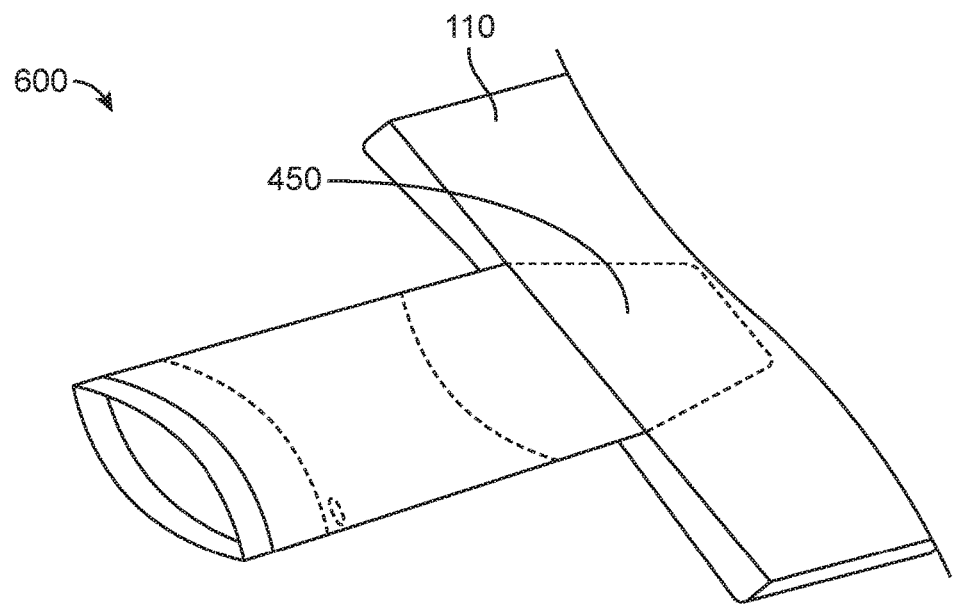

As shown in FIG. 6C, inflation valve 600 can be attached to inflatable object 110 so that a portion of inflation valve 600 is within inflatable object 110, thus creating invertible one-way valve 450.

Figure 6D:
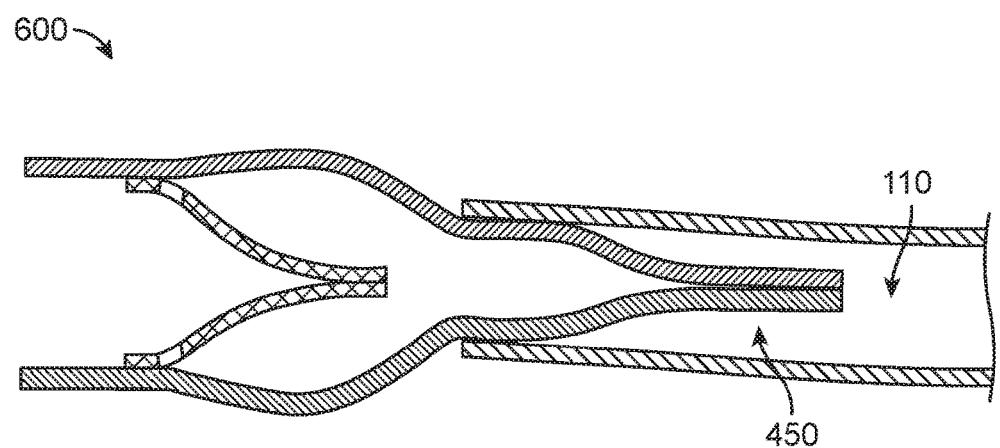

FIG. 6D illustrates a side sectional view of inflation valve 600. As illustrated, inflation valve 600 can be attached to inflatable object 110 so that a portion of inflation valve 600 is within inflatable object 110, thus creating invertible one-way valve 450.

Figure 7A:
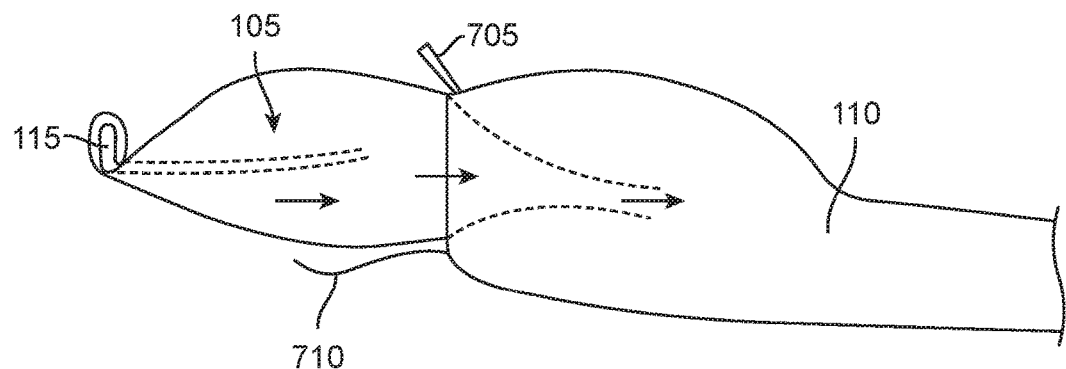
FIGS. 7A-7C illustrate an inflation chamber being rolled up to seal an inflatable object.
Figure 7B:
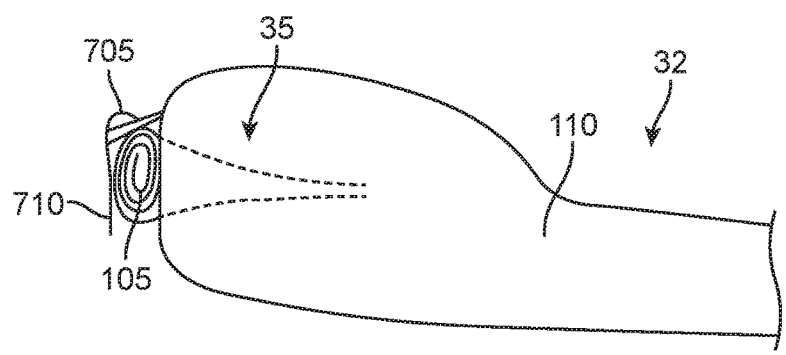

FIGS. 7A and 7B illustrate inflation chamber 105 being rolled up to seal inflatable object 110 to further prevent air from escaping inflatable object 110. As shown in FIG. 7A, inflation chamber 105 can be rolled from outside opening 115 towards inflatable object 110. Rolling inflation chamber in this manner can further inflate inflatable object 110 by forcing any air in inflation chamber 105 into inflatable object 110.

In some embodiments, inflation chamber 105 can be secured after being completely rolled, to keep inflation chamber 105 in the rolled position. For example, loop 705 and strap 710 can be attached to inflatable object 110 on either side of inflation chamber 105 and used to secure inflation chamber 105 after it has been rolled to seal inflatable object 110.

FIG. 7B illustrates strap 710 placed through loop 705 to secure inflation chamber 105 after it has been rolled. In some embodiments, strap 710 can be secured after being placed through loop 705. For example, strap 710 can be made of a loop and fastener material that can secure strap 710 after it has been placed through loop 705.

Figure 7C:
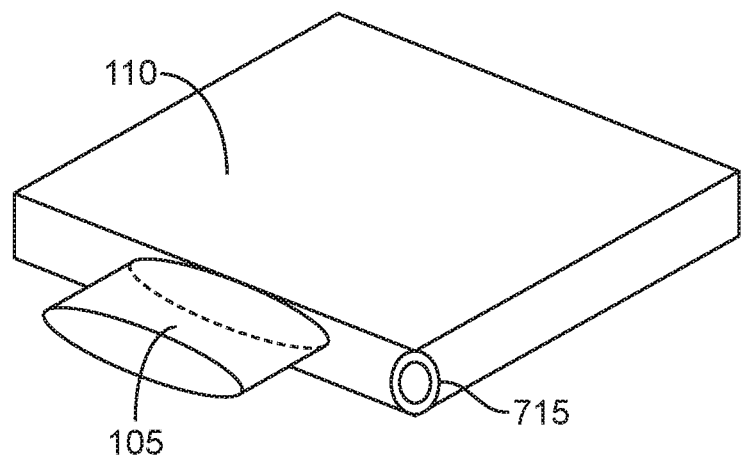

In some embodiments, inflation chamber 105 can be used primarily to deflate inflatable object 110. For example, as illustrated in FIG. 7C, inflatable object 110 can include traditional inflation valve 715 in addition to inflation chamber 105. A user can use traditional inflation chamber 715 to inflate inflatable object 110 and use inflation chamber 105 to quickly deflate inflatable object 110.

In this type of embodiments, inflation chamber 105 can be rolled to provide a seal that prevents air from escaping inflatable object 110. To deflate inflatable object 110, a user can unroll inflation chamber 105 and allow air to escape inflatable object 110. Because inflation chamber 105 is used primarily to deflate inflatable object 110, a one-way valve is not necessary, although one can be included. A user can use traditional inflation valve 715 to inflate inflatable object 110, and use inflation chamber 105 to deflate inflatable object 110.

Figure 8:
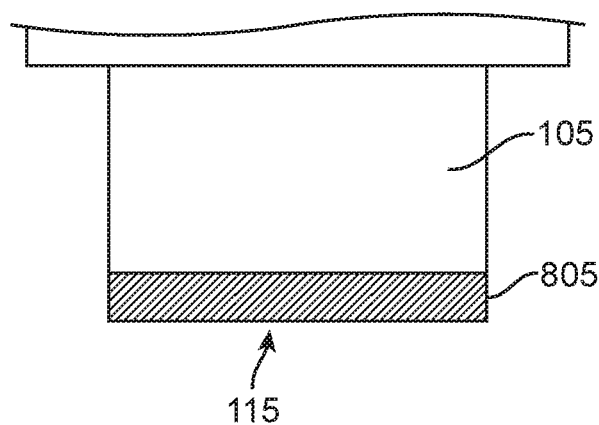
FIG. 8 illustrates an inflation chamber can be sealed at the outside open end.

FIG. 8 illustrates an embodiment in which inflation chamber 105 can be sealed at outside open end 115. For example, the inside of inflation chamber 105 can include sealing element 805 designed to seal inflation chamber 105. Sealing element 805 can be any type of sealing element known in the art. For example, sealing element 805 can be a Ziploc type sealer, toothed zipper, hook and loop, snaps, buttons, threaded screw closure, bail and gasket closure, snap lid closure, etc.

Figure 9A:
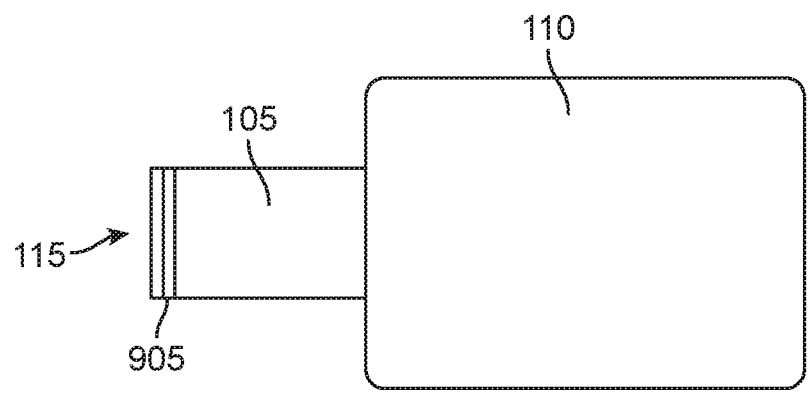
FIGS. 9A and 9B illustrate an inflation chamber that can be used as a storage bag for the inflatable object.
Figure 9B:
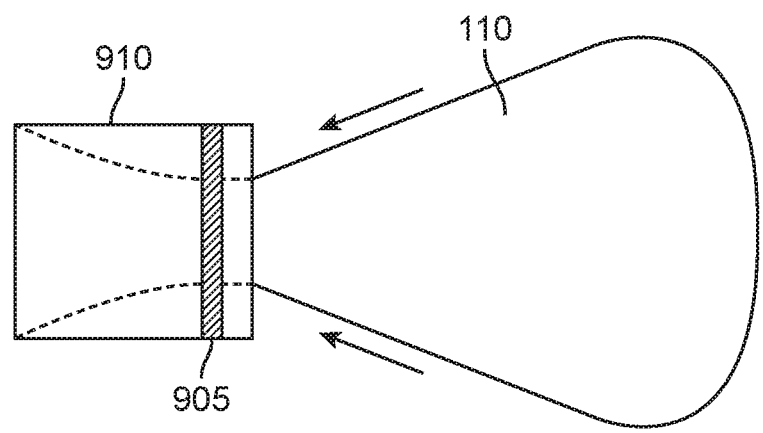

FIGS. 9A and 9B illustrate an embodiment in which inflation chamber 105 can be used as a storage bag for inflatable object 110 when inflatable object 110 is deflated. As shown in FIG. 9A, inflation chamber 105 can include sealing element 905 on the outside of inflation chamber 105, near outside opening 115. When inflatable object 110 is deflated, a user can invert inflation chamber 105 to create a storage bag and place inflatable object 110 into the storage bag.

FIG. 9B shows inflation chamber 105 inverted into storage bag 910. When inflation chamber 105 is inverted, sealing element 905 will be located on the inside of storage bag 910, thus allowing a user to seal the storage bag after placing inflation chamber 105 into storage bag 910.

Figure 10:
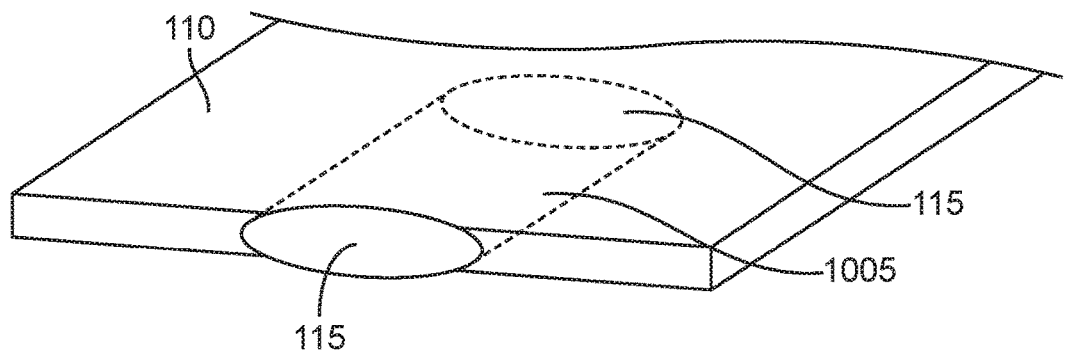
FIG. 10 illustrates an embodiment in which the inflation chamber does not protrude from the inflatable object.

FIG. 10 illustrates an embodiment in which the inflation chamber does not protrude from the inflatable object. As shown, inflation chamber 1005 is designed within inflatable object 110 such that outside opening 115 is flush with the edge of inflatable object 110. While inflation chamber 1005 does not protrude from inflatable object 110, it still functions as a conduit by which air can enter and/or exit inflatable object 110 through inside opening 120. As previous embodiments, one or more one-way valves can be attached to inflation chamber 1005 to prevent air from escaping inflatable object 110.

Figure 11:
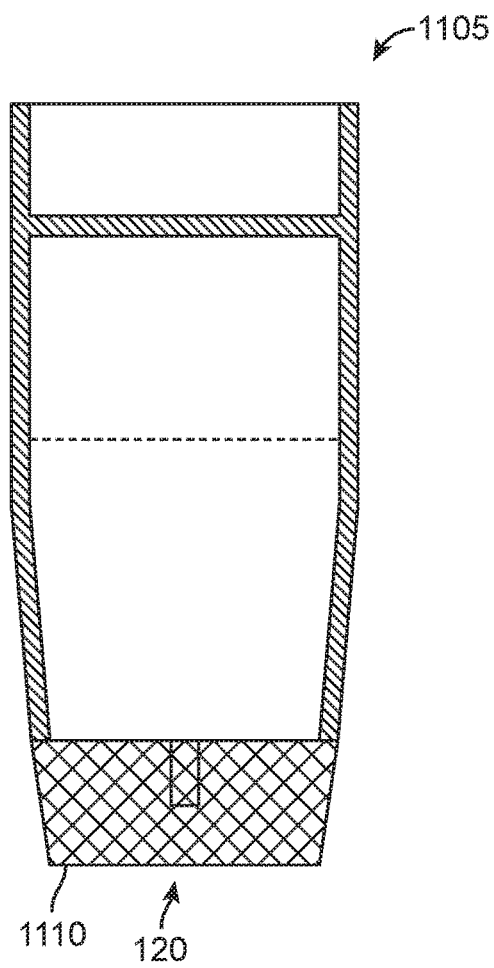
FIG. 11 illustrates an exemplary embodiment of an inflation valve including a covering.

FIG. 11 illustrates an exemplary embodiment of an inflation valve including a covering. In some embodiments, an inflatable object such as a mattress can be filled with loose insulation such as down feathers. The loose insulation provides additional comfort to the inflatable object. As illustrated inflation valve 1105 includes covering 1110 covering inside opening 120 of inflation chamber 105. Covering 1110 can be designed to allow air to flow through covering 1110 to enter and/or exit an inflatable object, while preventing objects of a certain size from entering and/or escaping an inflatable object.

In some embodiments, covering 1110 can be made of a flexible plastic or cloth mesh material so that use of the inflation chamber is not affected. For example, a user can still roll up inflation chamber 105, the inflatable object, invert an invertible one-way valve, etc.

The size of the openings in the mesh material used to create covering 1110 can be varied depending on the size of the objects that are to be prevented from entering and/or exiting an inflatable object. For example, a finer mesh with smaller holes can be used to prevent smaller objects from entering and/or exiting an inflatable object.

Figure 12:
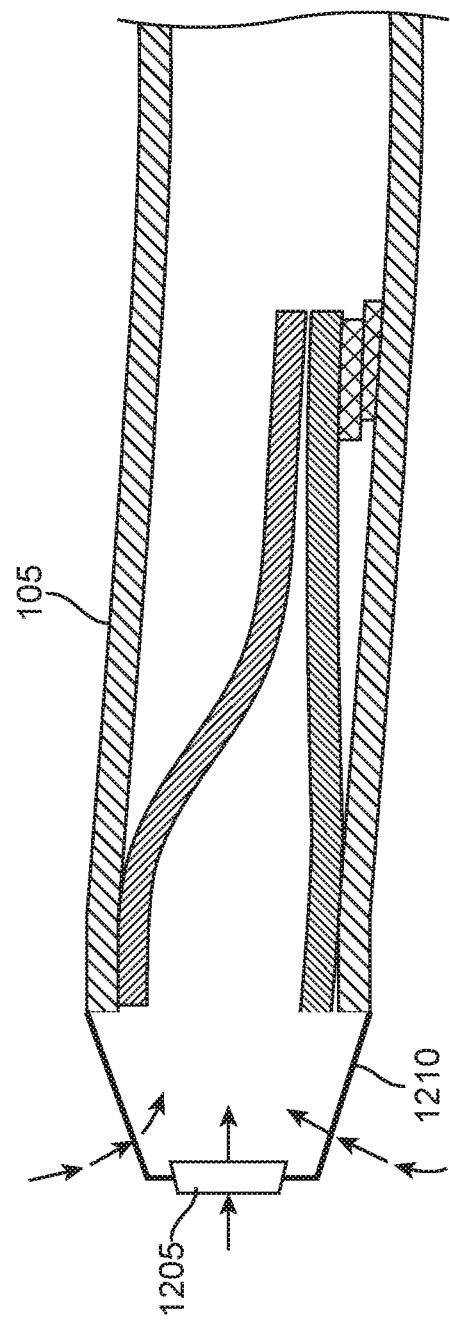
FIG. 12 illustrates an exemplary embodiment of using a fan along with the inflation valve.

FIG. 12 illustrates an exemplary embodiment of using a fan along with the inflation valve. As illustrated, fan 1205 can be attached to inflation chamber 105 via attachment piece 1210. Attachment piece 1210 can be designed to allow air from the surrounding areas to be drawn into inflation chamber 105 as fan 1205 is blowing air into inflation chamber 105.

In some embodiments, attachment piece 1210 can be rigid such as a metal or plastic cage. This can keep fan 1205 in a fixed position in relation to inflation chamber 105. Alternatively, in some embodiments, attachment piece 1210 can be made of a soft flexible material such as a flexible plastic or cloth mesh material.

Figure 13A:
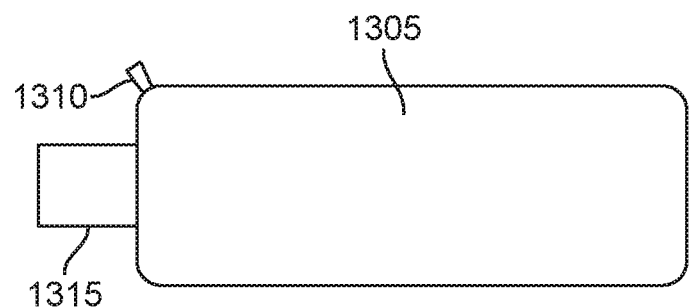
FIGS. 13A and 13B illustrate an embodiment of an inflatable valve including a secondary valve.
Figure 13B:
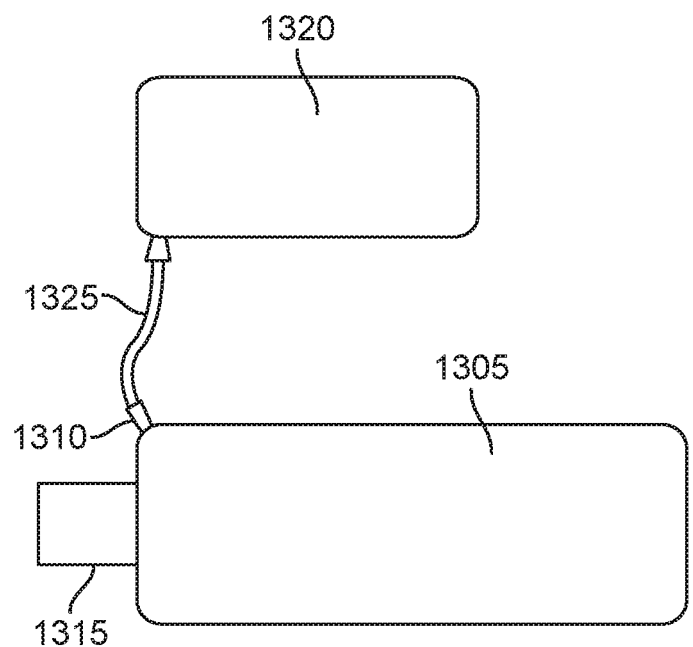

FIGS. 13A and 13B illustrate an embodiment in which an inflatable object includes a secondary valve. As shown in FIG. 13A, inflatable object 1305 includes secondary valve 1310 in addition to inflation chamber 1315, which allows for quick inflation of inflatable valve 1305. In some embodiments, secondary valve 1310 can be used to deflate inflatable object 1305 and/or add inflatable object 1305. For example secondary valve 1310 can be a traditional inflation valve. A user can thus select to inflate or deflate inflatable object 1305 using inflation valve 1315 or secondary valve 1310.

In some embodiments, secondary valve 1310 can be used to inflate a second inflatable object. For example, secondary valve 1310 can be designed to attach to a hose, tube or other conduit that can be used to inflate the second inflatable object.

FIG. 13B shows inflatable object 1305 and second inflatable object 1320. As shown, hose 1325 connects inflatable object 1305 to second inflatable object 1320 via a secondary valve 1310. A user can thus use inflatable object 1305 to inflate second inflatable object 1320. For example, a user can squeeze inflatable object 1305 to force air in inflatable object 1305 through hose 1325 and into second inflatable object 1320.

Although FIGS. 13A and 13B illustrates inflatable object 1305 including only one secondary valve, this is only one embodiment and is not meant to be limiting. One skilled in the art would recognize that an inflatable object can include any number of secondary valves, and this disclosure acknowledges any and all such embodiments.

The various embodiments described above are provided by way of illustration only and should not be construed to limit the scope of the disclosure. For example, the disclosed inflation valve can be used to inflate any type of inflatable object such as a mattress, pool toy, chair, pillow, etc. Those skilled in the art will readily recognize various modifications and changes that may be made to the principles described herein without following the example embodiments and applications illustrated and described herein, and without departing from the spirit and scope of the disclosure.

I claim:

1. An inflatable apparatus configured for being inflated by a user, the inflatable apparatus comprising:
    an inflatable object configured for receiving a volume of air;
    an inflation chamber protruding from the inflatable object, the inflation chamber defining at least one outer opening configured for receiving air from outside the inflatable object and at least one inner opening in fluid communication with the inflatable object, wherein the inflation chamber is configured for being unrolled into an open configuration in which the inflation chamber permits air to enter the inflatable object and rolled into a closed configuration in which the inflation chamber prevents air from escaping the inflatable object;
    a fastener configured for selectively securing the inflation chamber in the closed configuration; and
    a one-way valve defining a first open end and a second open end, wherein the one-way valve's first open end is attached to the interior of the inflation chamber at a location that is closer to the inflation chamber's at least one outer opening than to the inflatable object, and wherein the one-way valve's second open end is moveable relative to the inflation chamber and permits the one-way valve to be adjusted between a non-inverted orientation, in which the second open end is positioned inside of the one-way valve's first open end, and an inverted orientation, in which the second open end is positioned outside of the one-way valve's first open end;
    wherein the one-way valve is configured to permit inflation of both the inflation chamber and the inflatable object when the inflation chamber is in the open configuration and the one-way valve is in the non-inverted orientation;
    wherein the inflation chamber is configured such that, when inflated and rolled from the open configuration into the closed configuration, the inflation chamber forces air within the inflation chamber into the inflatable object; and
    wherein the one-way valve permits deflation of both the inflation chamber and the inflatable object when the inflation chamber is in the open configuration and the one-way valve is in the inverted orientation.

2. The inflatable apparatus of claim 1, wherein the fastener comprises a loop and strap configured for being engaged to secure the inflation chamber in the closed configuration.

3. The inflatable apparatus of claim 2, wherein the loop and strap are each secured to the inflatable object on opposite sides of the inflation chamber.

4. The inflatable apparatus of claim 1, wherein the inflation chamber includes at least one sealing element positioned proximate the inflation chamber's at least one outer opening.

5. The inflatable apparatus of claim 4, wherein the sealing element is configured for sealing the inflation chamber's at least one outer opening closed such that air is prevented from exiting the inflation chamber through the inflation chamber's at least one outer opening.

6. The inflatable apparatus of claim 1, wherein the inflation chamber's at least one outer opening is dimensioned for receiving a breath of air from a user at a distance from the at least one outer opening.

7. The inflatable apparatus of claim 1, further comprising an exterior valve disposed on an exterior portion of the inflatable object.

8. The inflatable apparatus of claim 7, wherein the exterior valve is adjustable between an open configuration in which air is permitted to enter and exit the inflatable object through the exterior valve and a closed configuration in which air is not permitted to enter or exit the inflatable object through the exterior valve.

9. The inflatable apparatus of claim 1, wherein the one-way valve's first open end spans the width of the inflation chamber at the location where the first open end is attached to the interior of the inflation chamber.

10. The inflatable apparatus of claim 1, wherein the one-way valve's first open end is attached to the interior of the inflation chamber adjacent the inflation chamber's at least one outer opening.

11. The inflatable apparatus of claim 10, wherein the one-way valve's first open end spans the width of the inflation chamber's at least one outer opening.

12. A method for manually inflating an inflatable apparatus, the inflatable apparatus comprising an inflatable object configured for receiving a volume of air and an inflation chamber protruding from the inflatable object, the method comprising the steps of:

inflating the inflatable apparatus by:

adjusting the inflation chamber into an unrolled, open configuration and a one-way valve disposed at least partially within the inflation chamber into a non-inverted orientation, wherein in the non-inverted orientation a first open end of the one-way valve is attached to the interior of the inflation chamber and a second open end of the one-way valve is positioned inside of the one-way valve's first open end;

at a distance from an outer opening of the inflation chamber, blowing a volume of air through the outer opening of the inflation chamber, through the one-way valve, and into the inflatable object, thereby inflating both the inflation chamber and the inflatable object; and thereafter, rolling the inflation chamber toward the inflatable object and into a closed configuration, thereby directing at least a portion of air in the inflation chamber into the inflatable object and preventing air from escaping the inflatable object; and deflating the inflatable by:

adjusting the inflation chamber back into the unrolled, open configuration and the one-way valve into an inverted orientation in which the second open end of the one-way valve is positioned outside of the one-way valve's first open end, thereby permitting deflation of both the inflation chamber and the inflatable object.

13. The method of claim 12, further comprising the step of securing the inflation chamber in the closed configuration using a fastener.

14. The method of claim 13, wherein the step of securing the inflation chamber in the closed configuration comprises securing a hook-and-loop fastener.

* * * * *